(12) United States Patent
Taketani et al.

(10) Patent No.: US 10,461,602 B2
(45) Date of Patent: Oct. 29, 2019

(54) FLUSH WATER TANK APPARATUS

(71) Applicant: TOTO LTD., Kitakyushu-shi, Fukuoka (JP)

(72) Inventors: Tomoyoshi Taketani, Kitakyushu (JP); Hideki Tanimoto, Kitakyushu (JP); Takashi Matsusaki, Kitakyushu (JP)

(73) Assignee: TOTO LTD., Kitakyushu-shi, Fukuoka (JP)

( * ) Notice: Subject to any disclaimer, the term of this patent is extended or adjusted under 35 U.S.C. 154(b) by 0 days.

(21) Appl. No.: 16/018,300

(22) Filed: Jun. 26, 2018

(65) Prior Publication Data

US 2019/0006906 A1    Jan. 3, 2019

(30) Foreign Application Priority Data

Jun. 30, 2017 (JP) .................. 2017-128633

(51) Int. Cl.
| | | |
|---|---|---|
| *H02K 5/10* | (2006.01) | |
| *E03D 5/10* | (2006.01) | |
| *E03D 11/14* | (2006.01) | |

(52) U.S. Cl.
CPC ............... *H02K 5/10* (2013.01); *E03D 5/105* (2013.01); *E03D 11/143* (2013.01); *E03D 11/146* (2013.01); *H02K 2205/09* (2013.01)

(58) Field of Classification Search
CPC ...... H02K 5/10; H02K 2205/09; E03D 5/105; E03D 5/10; E03D 11/143; E03D 11/146
USPC ......................................... 4/252.1, 367, 406
See application file for complete search history.

(56) References Cited

U.S. PATENT DOCUMENTS

| | | | | |
|---|---|---|---|---|
| 3,790,967 | A * | 2/1974 | Pignato | E03D 11/146 4/358 |
| 9,719,238 | B2 * | 8/2017 | Momoe | E03D 5/10 |
| 2016/0208471 | A1 * | 7/2016 | Yu | E03D 5/105 |
| 2017/0030065 | A1 * | 2/2017 | Bucher | E03D 9/02 |
| 2018/0216329 | A1 * | 8/2018 | Tanimoto | E03D 5/10 |

* cited by examiner

*Primary Examiner* — Tuan N Nguyen
(74) *Attorney, Agent, or Firm* — BakerHostetler

(57) ABSTRACT

A flush water tank apparatus capable of stable operational control of a discharge valve apparatus, and stable flush water supply to a toilet for long term. The flush water tank apparatus of the present invention includes a power drive unit comprising a motor and an output shaft, being a power drive unit capable of electrically operating a drain valve on a drain valve mechanism; and a housing portion formed so as to surround the perimeter of the outlet on a drive unit internal air passage extending from the motor in the interior of the flush water tank; wherein an air passage communicating from the motor of the power drive unit through the housing portion to the exterior of the flush water tank is formed.

9 Claims, 8 Drawing Sheets

FLUSH WATER TANK APPARATUS

TECHNICAL FIELD

The present invention pertains to a flush water tank apparatus, and particularly to a flush water tank apparatus for storing flush water to flush a toilet.

BACKGROUND ART

For some time, as set forth in Patent Document 1 (EP 2568089 A1), it is known that the flush water tank apparatuses is disposed so as to be concealed within the area in the reverse side of a wall surface as a flush water tank apparatus for supplying flush water to a flush toilet. Flush water is supplied from a concealed flush water tank apparatus concealed in the reverse side of a wall, to a flush toilet attached to the front surface of a wall.

Further, as set forth in Patent Document 2 (JP 2015-196949 A), it is known that a flush water tank apparatus comprises a handle attached to the outside of a reservoir tank, a shaft member extending so as to penetrate the side surface of the reservoir tank from this handle, a manual operation unit communicating with the shaft member inside the reservoir tank, and a power drive unit provided inside the reservoir tank, driven by a motor. In such a flush water tank apparatus, a wire is raised by the manual operation unit and the power drive unit, whereby a valve body in the discharge valve apparatus is raised, thereby flush water in the reservoir tank is discharged and the toilet is flushed.

SUMMARY OF INVENTION

Technical Problem

However, in a flush water tank apparatus such as that shown in Patent Document 2, the power drive unit is disposed inside the reservoir tank. Therefore when flush water stored in the reservoir tank evaporates, the problem can arise that moisture flows into the motor of the power drive unit and condenses, so that the power drive unit, including the motor, may rust and degrade, or the motor may malfunction. If the power drive unit malfunctions, control of the discharge valve apparatus will malfunction, raising the problem of unstable flush water supply to the toilet.

In addition, when a power drive unit having a motor is disposed inside a concealed flush water tank apparatus, as shown in Patent Document 1, the flush water tank apparatus is concealed on the reverse side of the wall, therefore no handle or shaft member can be installed on the flush water tank apparatus. This raises the problem that the handle and shaft member cannot form an air passageway between the interior of the tank and the exterior of the tank, and when flush water stored in the reservoir tank evaporates, it may flow more easily into the interior of the motor in the power drive unit. In particular, because a concealed flush water tank apparatus such as that in Patent Document 1 is concealed on the reverse side of the wall, the problem arises that in the event of degradation or malfunction due to rusting, etc. of the power drive unit, repair of the power drive unit or maintenance such as part replacement are made difficult. It is therefore important to solve to the above-described problems.

On the other hand when a power drive unit is disposed inside the flush water tank apparatus, consideration has also been given to air-sealing around the motor inside the power drive unit to prevent entering of moisture. However, after internal temperature in the power drive unit has risen due to motor operating heat, then the motor stops and the interior of the power drive unit cools, the internal temperature drops, and condensate is produced on the interior. This poses a problem in that it is difficult to seal around the perimeter of the motor inside the power drive unit to prevent entering of moisture.

The present invention was undertaken in order to solve problems required by the above-described conventional art, and has the object of providing a flush water tank apparatus capable of operationally controlling a discharge valve mechanism in a stable manner for a long period of time, and of stably supplying flush water to a toilet.

Solution to Problem

In order to resolve the above-described issues, the present invention is a flush water tank apparatus storing flush water for flush a toilet, comprising: a flush water tank having a discharge opening; a discharge valve mechanism having a discharge valve configured to open and close the discharge opening by an operation of the discharge valve; a power drive unit mounted so as to be concealed in an interior of the flush water tank, and capable of electrically operating the discharge valve of the discharge valve mechanism, wherein the power drive unit comprises a motor rotationally driven by electricity and an output shaft for outputting rotation of the motor; and a housing portion formed so as to surround an outlet of a drive unit interior air passage extending from the motor of the power drive unit inside the flush water tank; wherein the housing portion is opened toward an outside of the flush water tank, and an air passage is formed to communicate from the motor of the power drive unit through the housing portion to the exterior of the flush water tank.

In the invention thus constituted, the housing portion is formed to surround the perimeter of the outlet on the air passage inside the drive unit extending from the motor of the power drive unit, therefore moisture inside the reservoir tank can be constrained from penetrating into the motor of the power drive unit. In cases where moisture penetrates the housing portion, or temperature of the motor is cooled after the motor emits heat and condensate occurs around the motor, an air passage which communicates from the motor through the housing portion to the exterior of the flush water tank is formed, therefore moisture is released from the interior (inner portion) of the housing portion to the atmosphere in the outside of the flush water tank. Thus according to the present invention, moisture can be prevented from condensing at the interior of the power drive unit motor, and degradation or malfunction of the motor can be constrained from occurring. Therefore according to the present invention, the power drive unit disposed to be concealed inside the flush water enables long term, stable operational control of a discharge valve mechanism, and stable supply of flush water to a toilet body.

In the present invention, preferably, the power drive unit further comprises a casing in which the motor and the output shaft are disposed; wherein an output shaft-side end portion passing through the output shaft and forming an air-sealing structure, and an air passage outlet portion, in which the outlet of the air passage extending from the motor is formed, and the air passage outlet portion is housed inside the housing portion.

In the invention thus constituted, because the air passage outlet portion on which an outlet is formed on the air passage inside the power drive unit extending from the motor is housed in the housing portion, the housing portion can be constituted at a minimum required size to surround the perimeter of the air passage outlet portion, and the housing portion disposed inside the flush water tank can be compactly formed. Therefore the present invention enables an increase in the degree of freedom to place the power drive unit and the housing portion. In addition, workability can be improved when installing the power drive unit and housing portion inside the flush water tank.

The present invention preferably further comprises an overflow pipe for discharging flush water exceeding full water level in the flush water tank from the discharge opening, and the housing portion is disposed above the top end of the overflow pipe.

In the invention thus constituted, the housing portion is disposed above the top end of the overflow pipe, therefore even if the flush water level in the flush water tank rises over the full water level, flush water can be prevented from flowing into the power drive unit inside the housing portion. Furthermore, according to the present invention, leakage of flush water to outside the flush water tank from the housing portion can be prevented, even when the flush water level inside the flush water tank rises over the full water level.

In the present invention, preferably, the housing portion is formed to surround the perimeter of a communicating hole formed in the wall surface of the flush water tank.

In the present invention thus constituted, the housing portion is formed to surround the perimeter of a communicating hole formed in the wall of the flush water tank. Therefore the need to add a separate member for forming an air passage is eliminated, and communication between the interior of the housing portion and the exterior of the flush water tank can be effected by a communication hole formed in the wall of the flush water tank, so that the air passage can be compactly formed inside the flush water tank.

In the present invention, preferably, the communication hole is formed in the wall on the back side of the flush water tank.

In the invention thus constituted, the communication hole is formed in the wall on the back side of the flush water tank, therefore even in a flush water tank apparatus disposed in a position easily seen by toilet users, the communication hole is formed on the rear wall surface in rear side of the flush water tank, and therefore can be obscured from users, and design characteristics of the flush water tank apparatus can be improved.

In the present invention, preferably, the output shaft of the power drive unit extends vertically, and the housing portion is affixed to the flush water tank, and is formed to support the power drive unit. In the invention thus constituted, a vertical orientation is adopted for the power drive unit so that the power drive unit in which the output shaft of the power drive unit extends in the vertical direction, and space inside the flush water tank can be effectively used. Thus by using the present invention, the degree of freedom of design for devices installed inside the flush water tank can be improved. In addition, the housing portion can also serve as a structure for supporting the power drive unit, so the need to add a separate member to support the power drive unit can be eliminated. Therefore according to the present invention, the power drive unit and housing portion can be made comparatively compact.

In the present invention, preferably, the housing portion comprises an extended portion extending through a lateral the side of the power drive unit to upper portion; the extended portion is linked to the output shaft of the power drive unit.

In the present invention thus constituted, the housing portion can support the power drive unit from lower portion, and supports at the top the discharge valve mechanism linked to the output shaft of the power drive unit at upper side portion. Therefore according to the present invention deformation, breakage, and malfunctions of these members caused by the weight of the power drive unit and the discharge valve mechanism can be constrained.

In the present invention, preferably, the flush water tank is a concealed-type tank concealed in the reverse side of a wall in the washroom.

In the invention thus constituted, in a concealed-type flush water tank concealed on the reverse side of the wall surface of the washroom, moisture in the flush water tank can be constrained from penetrating into the motor of the power drive unit. Also, according to the present invention, moisture can be prevented from condensing at the interior of the motor in the power drive unit, so motor degradation or malfunction can be constrained from occurring. Thus according to the present invention, the power drive unit disposed to be concealed inside the flush water tank enables long term, stable operational control of a discharge valve mechanism, and a stable supply of flush water to a toilet.

In the present invention, preferably, the housing portion forms a water drain portion communicating from the interior of the housing portion to the interior of the flush water tank in the lower portion of the housing portion.

In the invention thus constituted, even if condensation of moisture occurs inside the housing portion, the condensed water can be discharged through the gap for draining water from the interior of the housing portion to the interior of the flush water tank, even if condense from the moisture in the housing portion occurs. Thus occurring a condition that condensate water accumulates in the interior of the housing portion and produces moisture in the interior of housing portion can be prevented.

Advantageous Effects of the Invention

The flush water tank apparatus of the present invention enables stable operation and control of a discharge valve mechanism, and stable supply of flush water to a toilet for long term.

DESCRIPTION OF EMBODIMENTS

Below, referring to the attached figures, we explain a flush water tank apparatus according to an embodiment of the present invention. First, referring to FIG. 1, we explain an overview of a toilet system comprising a flush water tank apparatus according to an embodiment of the invention.

Figure 1:
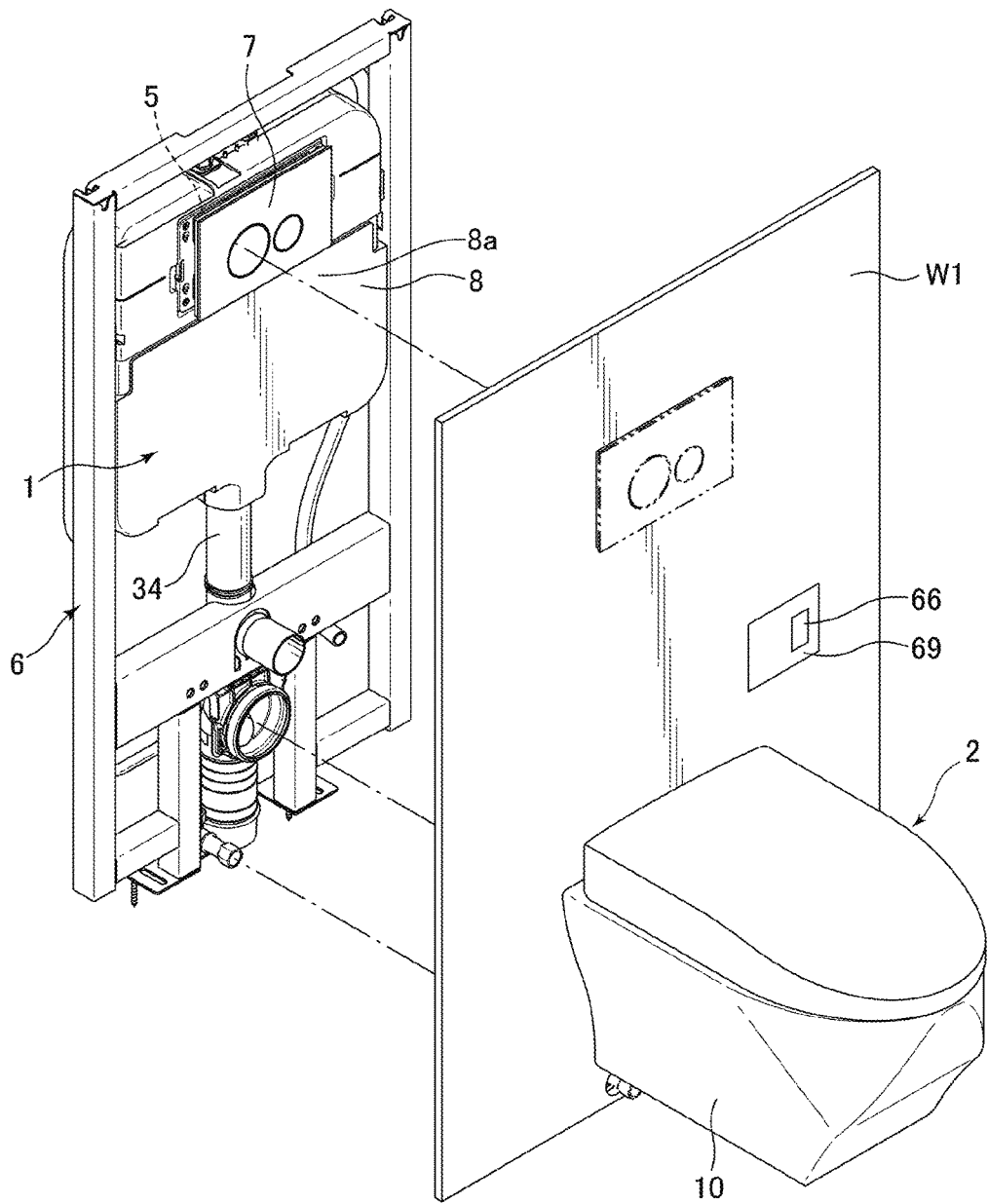
FIG. 1 is a simplified partial perspective view showing a toilet system comprising a flush water tank apparatus according to an embodiment of the invention.

As shown in FIG. 1, a flush toilet tank apparatus 1 according to an embodiment of the invention stores flush water for flushing a wall-hung flush toilet 2, and supplies flush water to the flush toilet 2, in a toilet system T. The flush toilet tank apparatus 1 according to an embodiment of the invention is not limited to the wall-hung flush toilet 2, but may also be applied to a floor-mounted flush toilet.

The left and right sides of this flush toilet tank apparatus 1 are affixed to an affixing apparatus 6 for affixing back end portions of a flush toilet 2 in toilet system T from the reverse side of a wall, through wall W1.

The flush toilet tank apparatus 1 also comprises a gravity-fed flush water tank 8, concealed inside the reverse-side area of the wall W1, flush water inside this flush water tank 8 is supplied to toilet main body 10 of the flush toilet 2 by gravity. The flush toilet tank apparatus 1 is concealed on the reverse side of the wall W1 on which the toilet system T is installed, and is a concealed flush toilet tank apparatus. Because the flush toilet tank apparatus 1 is attached to the reverse side of the wall W1, space extending toward a rear direction within the flush water tank 8 is limited to a small amount. An opening portion 5 for post-installation maintenance is formed on the top portion of a side wall 8a on the front side of the flush toilet tank apparatus 1. When the flush toilet tank apparatus 1 is used, a panel-shaped member 7 is attached to the opening portion 5, blocking it.

The flush toilet tank apparatus 1 of the present embodiment is not limited to being a concealed-type flush water tank; it may be applied to a common outside-mounted flush water tank having a structure in which a power drive unit 54, described below, is housed internally and, more preferably, may be applied to a common outside-mounted flush water tank having a structure in which a power drive unit 54, described below is housed within, and, further, not having a manual operating portion such as a handle.

Figure 2:
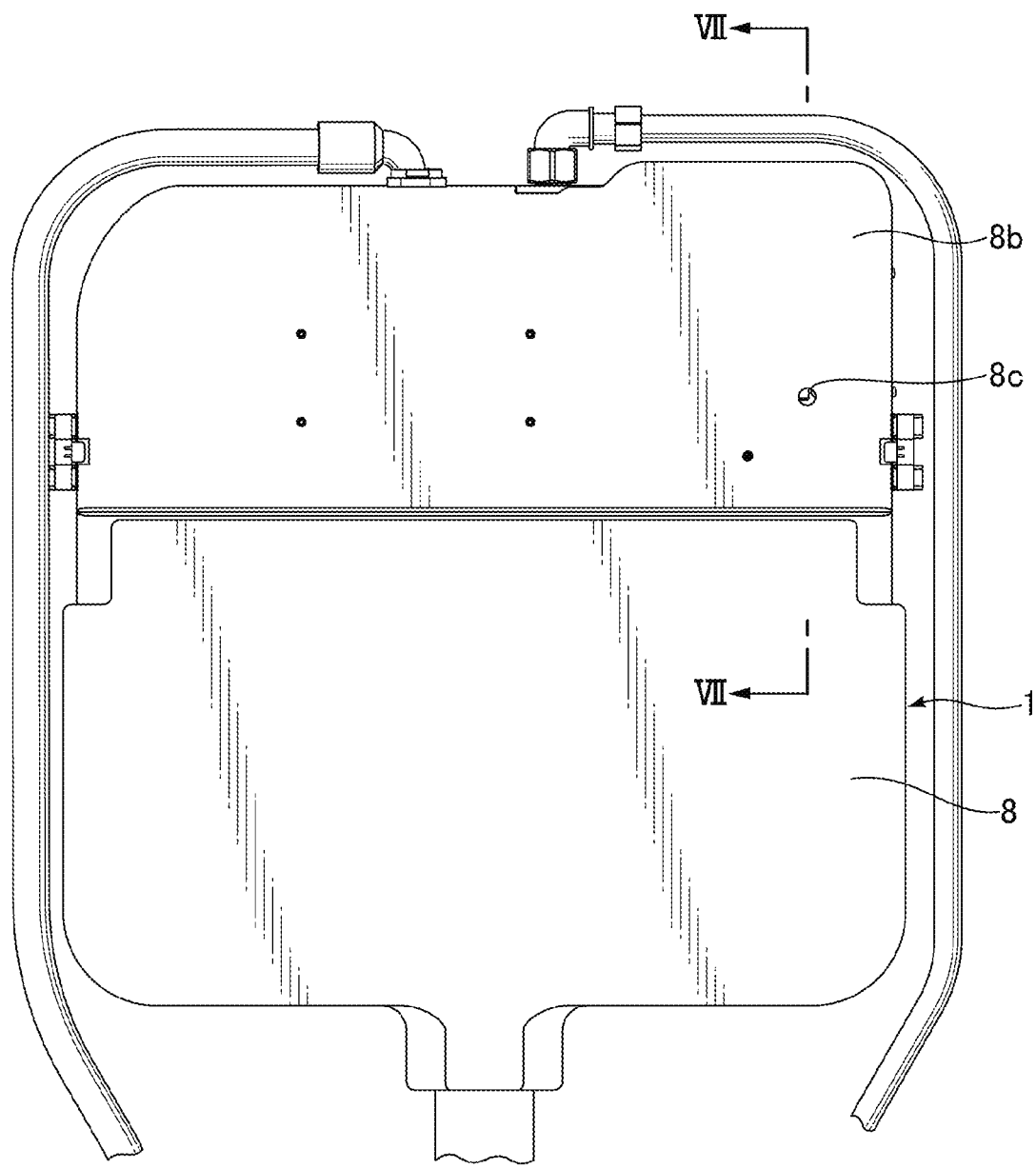
FIG. 2 is a rear elevation showing a flush water tank apparatus according to an embodiment of the invention.

As shown in FIG. 2, a communication hole 8c passing through the wall is formed on the rear side wall 8b of the flush water tank 8 in a flush toilet tank apparatus 1. The communication hole 8c forms an air hole communicating from the interior to the exterior of the flush water tank 8.

Figure 3:
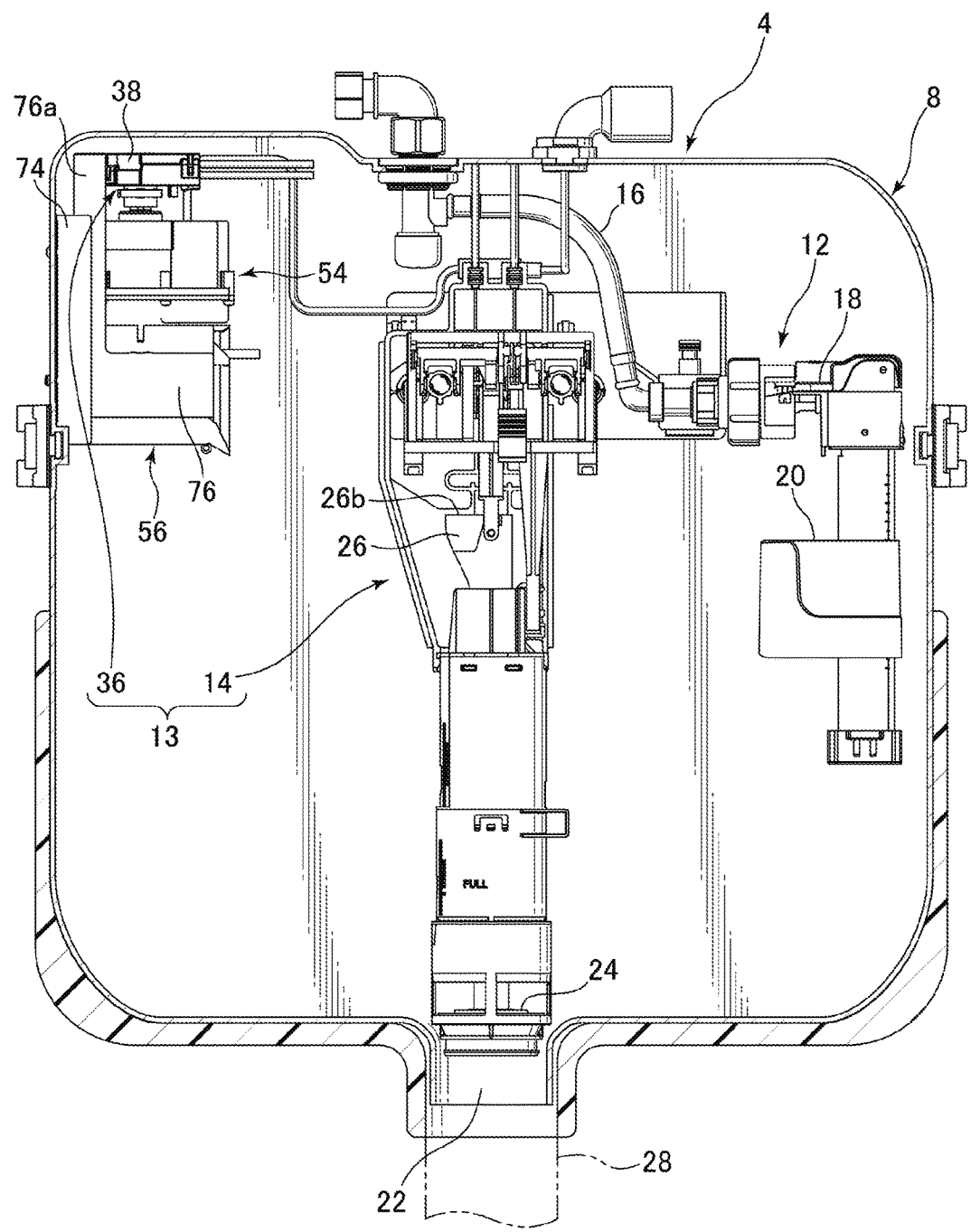
FIG. 3 is a simplified front elevation showing the interior structure of a flush water tank apparatus according to an embodiment of the invention.

As shown in FIG. 3, a supply valve apparatus 12 and discharge valve mechanism 13 are respectively mounted inside flush water tank 8 of the flush toilet tank apparatus 1.

First, as shown in FIG. 3, the supply valve apparatus 12 comprises: a supply pipe 16 connected to a supply source such as a municipal water supply (not shown) outside of the flush water tank 8, a supply valve 18 for switching between spouting and stopping of flush water supplied from this supply pipe 16, and a float 20 for opening and closing the supply valve 18 by moving up and down in response to fluctuation in the water level inside the flush water tank 8. Details of the supply valve apparatus 12 are the same as the conventional art, therefore are not explained here.

Figure 4:
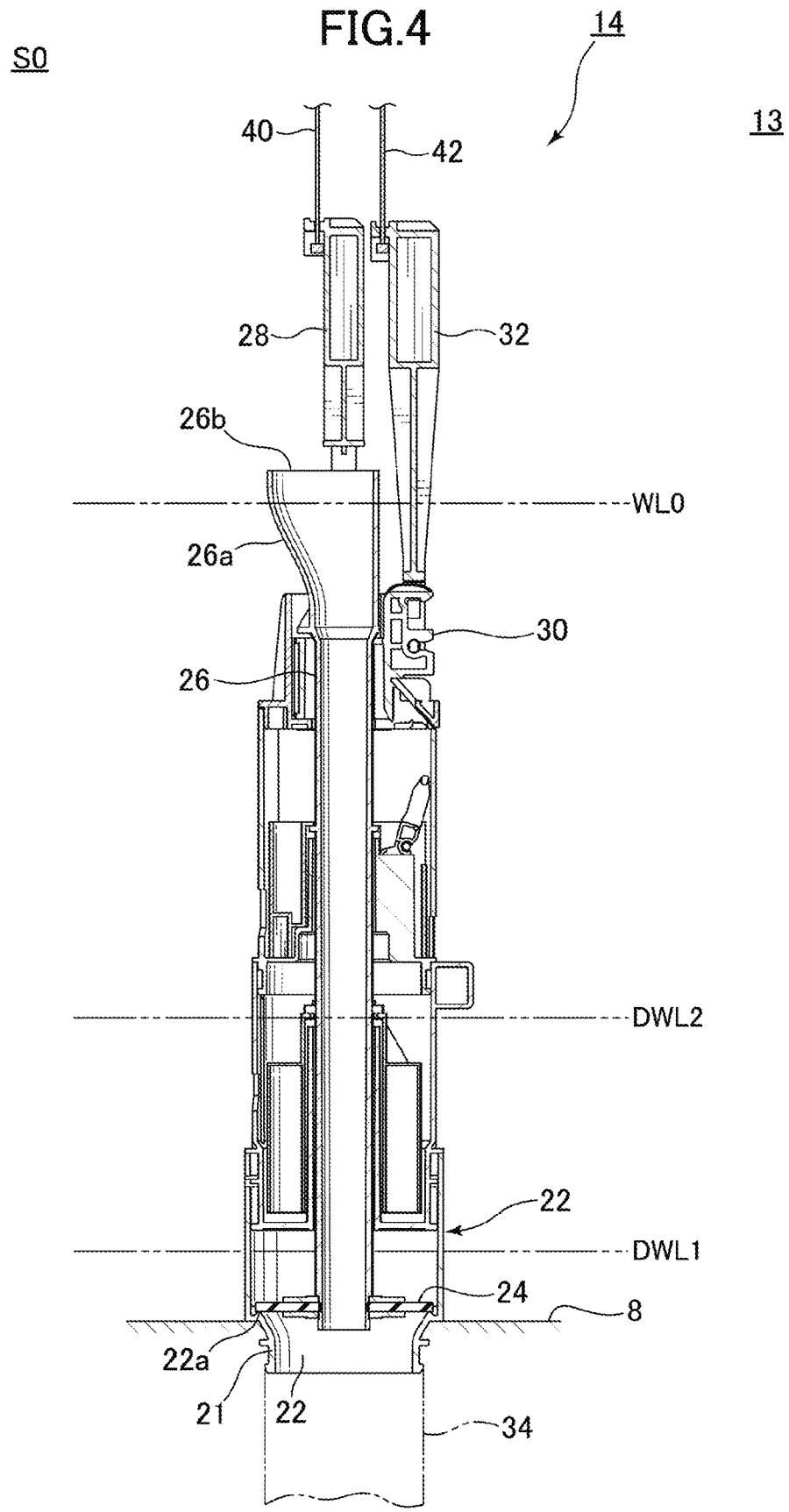
FIG. 4 is a simplified front elevation cross section showing the standby state (closed state) prior to starting a valve opening operation on the discharge valve main unit of the discharge valve mechanism on a flush water tank apparatus according to an embodiment of the invention.

As shown in FIGS. 3 and 4, the discharge valve mechanism 13 comprises a discharge valve main unit 14 and a discharge valve operating portion 36.

The discharge valve main unit 14 comprises: a discharge port-forming member 21, a discharge valve body 24, an overflow pipe 26, a large flush mode operating lever 28, a hook member 30, and a small flush mode operating lever 32.

The discharge port-forming member 21 is connected to the bottom portion of the flush water tank 8; it forms a discharge port 22 on a bottom surface in the flush water tank 8 and forms a valve seat 22a along an upper edge of the discharge port 22. The discharge port 22 is connected to a water conduit (not shown) in a toilet main body 10 through a connecting pipe 34.

The discharge valve body 24 is attached in the vicinity of the lower end of the overflow pipe 26; when the overflow pipe 26 is at the lowermost position, the discharge valve body 24 contacts the valve seat 22a and closes off the discharge port 22. The overflow pipe 26 is able to slide up and down. A large flush mode operating lever 28 is linked to the outside surface of an upper opening-forming portion 26a on the overflow pipe 26. When operating to open the valve in the large flush mode, the operating lever 28 is mechanically raised by a first operating wire 40, described below, so that the overflow pipe 26 and discharge valve body 24 rise, releasing the discharge port 22.

A hook member 30 is mounted to the lower portion of the upper opening-forming portion 26a on the overflow pipe 26. A small flush mode operating lever 32 is linked to this hook member 30.

When operating to open the valve in the small flush mode, the operating lever 32 is mechanically raised by a second operating wire 42, described below, so that the overflow pipe 26 and the discharge valve body 24 together with the hook member 30 rise, releasing the discharge port 22.

I.e., the entirety of the overflow pipe 26, operating levers 28 and 32, and discharge valve body 24 substantially functions as a discharge valve body portion. Thus the discharge valve mechanism 13 opens and closes the discharge port 22 by the movement of the discharge valve body 24 in the discharge valve body portion.

When the water level inside the flush water tank 8 exceeds the full water level WL0 at the top end 26b position of the overflow pipe 26, this excessive flush water is discharged from the overflow pipe 26 into the discharge port 22 which is always connected thereto. The overflow pipe 26 may be mounted inside the flush toilet tank apparatus and independent of the discharge valve body portion. Other functional details of the discharge valve main unit 14 are the same as the conventional art, therefore are not explained here.

As shown in FIGS. 3 through 7, the discharge valve operating portion 36 comprises: a casing 38, a first operating wire 40 for the large flush mode, a second operating wire 42 for the small flush mode, a pulley 46 (see FIG. 7), and a fastener 48.

The casing 38 holds the pulley 46 on the interior so that it can rotate.

The first operating wire 40 links the operating lever 28 for the large flush mode and the pulley 46. The first operating wire 40 is disposed inside a first protective tube 50.

The second operating wire 42 links operating lever 32 for the small flush mode and the pulley 46. The second operating wire 42 is disposed inside a second protective tube 52.

Figure 7:
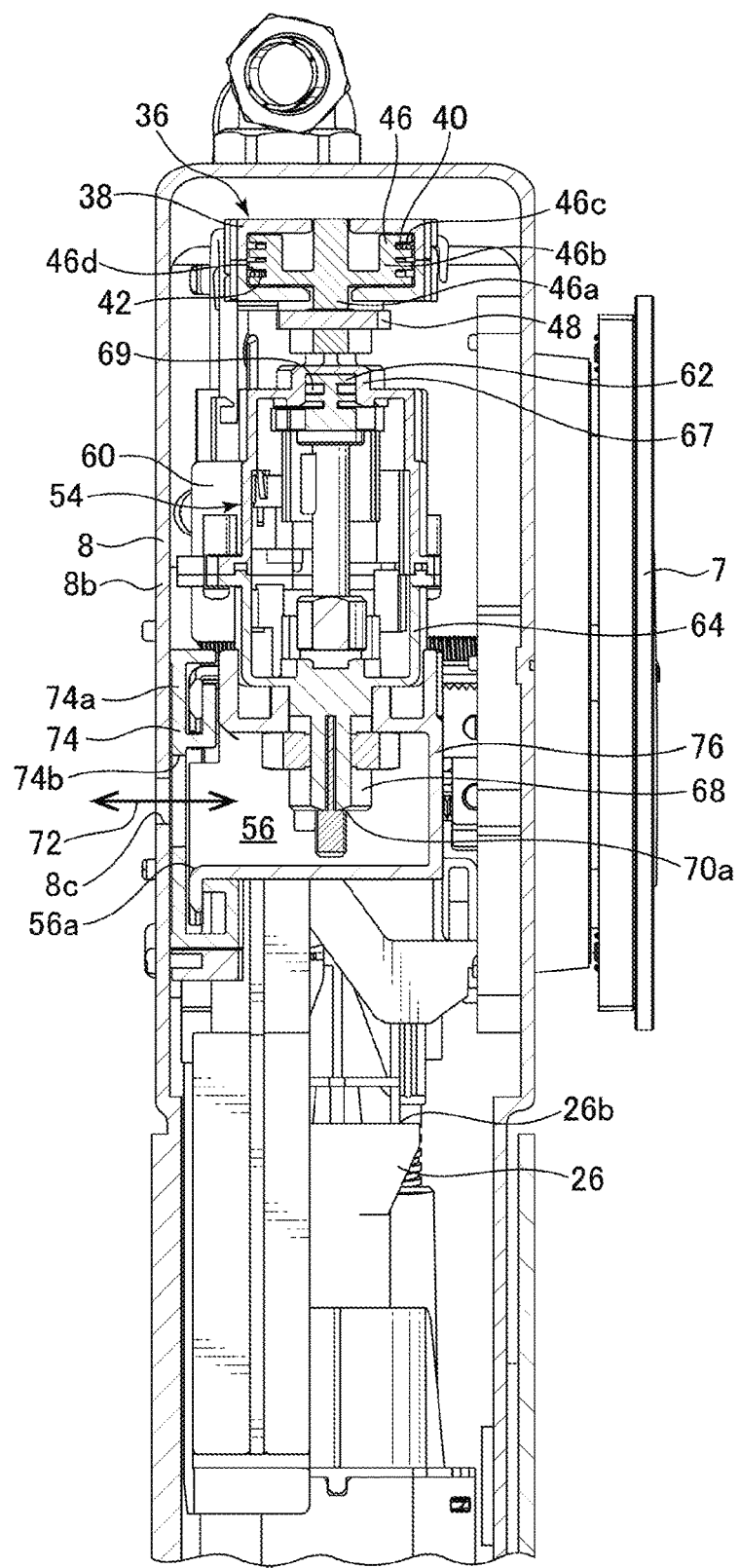
FIG. 7 is a cross section viewed along line VII-VII in FIG. 2.

As shown in FIG. 7, the pulley 46 comprises a shaft portion 46a to which the output shaft 62 on the power drive unit 54, described below, is connected, and an approximately annular rotary wind-up portion 46b projecting on the radial outward side from this shaft portion 46a. The shaft portion 46a of the pulley 46 is affixed to the output shaft 62 by fitting the fastener 48 into the shaft portion 46a from the outside of the shaft portion 46a at a predetermined position on the outer surface thereof.

The first operating wire 40 is attached to the outside perimeter surface of the rotary wind-up portion 46b of the pulley 46, and a first guide channel 46c for guiding the first operating wire 40 when the first operating wire 40 is being wound up by the rotary wind-up portion 46b is formed thereon.

Also, the second operating wire 42 is attached to the outside perimeter surface of the rotary wind-up portion 46b of the pulley 46, and a second guide channel 46d for guiding the second operating wire 42 when the second operating wire 42 is being wound up by the rotary wind-up portion 46b is formed thereon.

Figure 5:
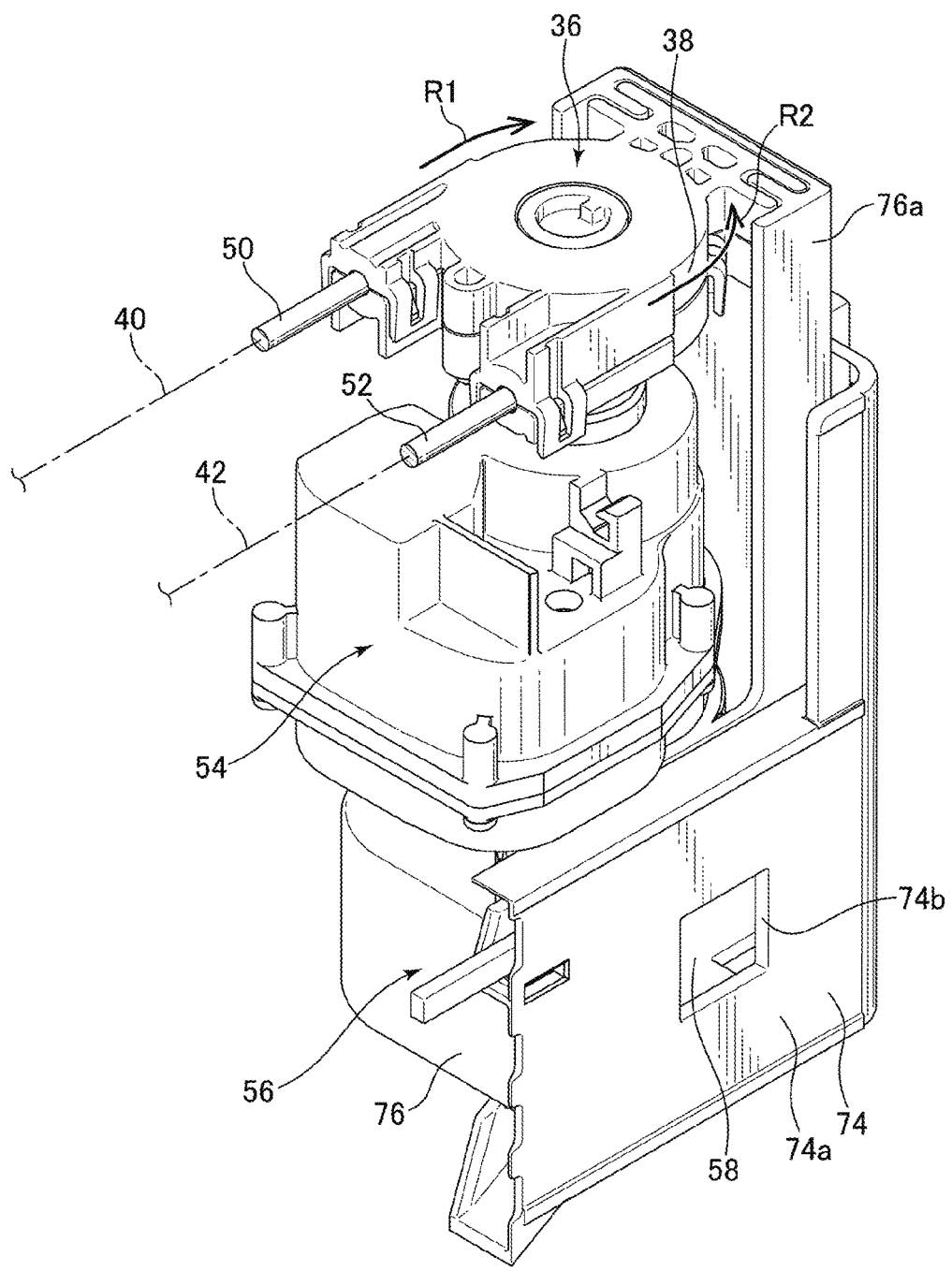
FIG. 5 is a simplified perspective view seen from diagonally above of the rear side of the discharge valve operating portion in a flush water tank apparatus discharge valve mechanism, a power drive unit, and a housing portion.

By this structure, the pulley 46 is able to wind up and raise the first operating wire 40 when rotated in a first direction R1 (see FIG. 5), and is able to wind up and raise the second operating wire 42 when rotated in a second direction R2 (see FIG. 5).

In addition, the flush toilet tank apparatus 1 comprises a power drive unit 54 for operating a discharge valve, and a housing portion 56, being a housing chamber formed on the interior of a flush water tank 8.

Figure 8:
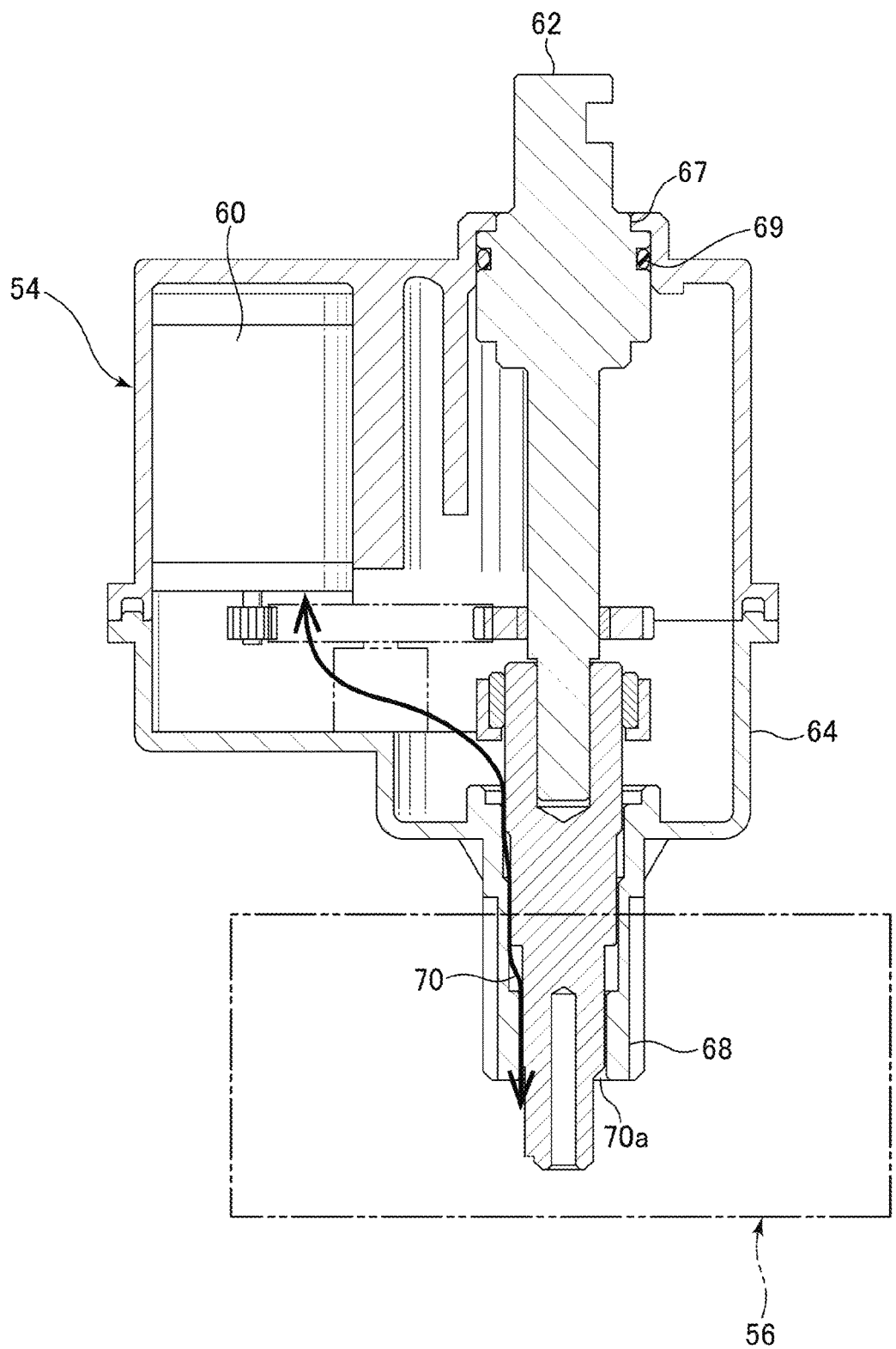
FIG. 8 is a simplified cross section showing the internal structure of a flush water tank apparatus power drive unit according to an embodiment of the invention, seen along a cross section in the left-right direction of a flush water tank apparatus.

The power drive unit 54 is mounted so that its entirety is concealed within the flush water tank 8. Being concealed means that it is disposed within the flush water tank 8 so that the power drive unit 54 cannot be seen from outside the flush water tank 8. The power drive unit 54 is arranged not to penetrate a wall portion of the flush water tank 8 wall portion and extend to the outside of the flush water tank 8. I.e., the entire power drive unit 54 is disposed in the internal space of the flush water tank 8. The power drive unit 54 enables the discharge valve body 24 of the discharge valve mechanism 13 to be power-operated. As shown in FIG. 8, the power drive unit 54 comprises: a motor 60 for providing rotary drive force using electrical power supplied from a power supply, an output shaft 62 capable of rotary driving using the rotational drive force of the motor 60, and a casing 64 for internally placing the motor 60 and the output shaft 62.

The motor 60 is electrically connected to a control portion 66, and is controlled by receiving commands from the control portion 66. Inside the power drive unit 54, rotation of the motor 60 is transferred by a gear or the like (not shown) to the output shaft 62. The output shaft 62 is rotated in the first direction R1 when it receives a valve opening command for a large flush mode, and is rotated in the second direction R2, opposite the first direction, when it receives a valve opening command for a small flush mode. The motor 60 is able to easily switch between valve opening operation for the large flush mode and valve opening operation for the small flush mode by reversing the direction of rotation.

As shown in FIG. 1, the control portion 66 is disposed on an operating panel 69 provided on the wall W1. The control portion 66 controls driving of the motor 60 based on a signal transmitted by user operation of an operating panel 69 and/or a signal sensed and transmitted by a human body detection sensor (not shown) disposed in the vicinity of the flush toilet 2.

As shown in FIGS. 7 and 8, the output shaft 62 is disposed to extend in the vertical direction of the power drive unit 54, and to project on the top side of the power drive unit 54. A vertical placement for the power drive unit 54 is adopted such that the output shaft 62 of the power drive unit 54 extends in the vertical direction. In the vertically placed power drive unit 54, because the lateral width of the power drive unit 54 is formed to be relatively short, the lateral placement space in the flush water tank 8 for equipment other than the power drive unit 54 can be formed to be relatively wide.

When the output shaft 62 is rotationally driven in a first direction R1 (see FIG. 5) by the motor 60, the pulley 46 is rotated in the first direction R1, the pulley 46 raises the first operating wire 40 and the discharge valve body 24 linked thereto, so that a large flush mode toilet flush using a first flush water amount is executed. As shown in FIG. 4, in the large flush mode, a first flush water amount, which has descended from the full water level WL0 in the flush water tank 8 to the lowest water level DWL1, is supplied from the discharge port 22 to the toilet main body 10.

When the output shaft 62 is rotationally driven in a second direction R2 (see FIG. 5) by the motor 60, the pulley 46 is rotated in the second direction R2; the pulley 46 raises the second operating wire 42 and the discharge valve body 24 linked thereto, so that a small flush mode toilet flush using a second flush water amount is executed. As shown in FIG. 4, in the small flush mode, a second flush water amount, which has descended from the full water level WL0 in the flush water tank 8 to the lowest water level DWL2, is supplied from the discharge port 22 to the toilet main body 10.

An output shaft-side end portion 67 formed to pass through the output shaft 62, and an air passage outlet portion 68 where an outlet 70a is formed on a drive unit internal air passage 70 extending from the motor 60, are formed on the casing 64, and this air passage outlet portion 68 is housed within the housing portion 56. The casing 64 forms a structure which maintains airtightness at parts other than the air passage outlet portion 68.

The output shaft 62 extends in the vertical direction of the power drive unit 54, therefore the output shaft-side end portion 67 is disposed on the top portion of the power drive unit 54. The output shaft-side end portion 67 forms a structure for generally maintaining airtightness between the exterior and interior of the casing 64 using a seal member 69 disposed on the interior.

The air passage outlet portion 68 is disposed at a position lower than the output shaft-side end portion 67, for example at the bottom portion of the power drive unit 54. The drive unit internal air passage 70 is formed in the casing 64 by a gap which passes air between structures such as the motor 60 and the output shaft 62. The drive unit internal air passage 70 is schematically shown by arrow 70 in FIG. 8. The drive unit internal air passage 70 connects the interior of the motor 60 with the housing portion 56, permitting outside air to flow into the motor 60, and forms a passage capable of permitting moisture generated close to the motor 60 to flow out to the housing portion 56. The housing portion 56 is attached to the casing 64 surrounding the air passage outlet portion 68 at the lower portion of the power drive unit 54. Hence the housing portion 56 is formed to support the power drive unit 54 through the casing 64.

The housing portion 56 is formed to surround the perimeter of the outlet 70a on the drive unit internal air passage 70 which extends from the motor 60 of the power drive unit 54. If a condition that the outlet 70a of the drive unit internal air passage 70 is placed within the housing portion 56 is fulfilled, the housing portion 56 may be formed so that either part of the power drive unit 54 is disposed on the interior thereof, or so that, for example, the entire power drive unit 54 is disposed on the interior thereof. In addition, the housing portion 56 is formed to surround the perimeter of the communication hole 8c formed in the side wall 8b of the flush water tank 8.

Figure 6:
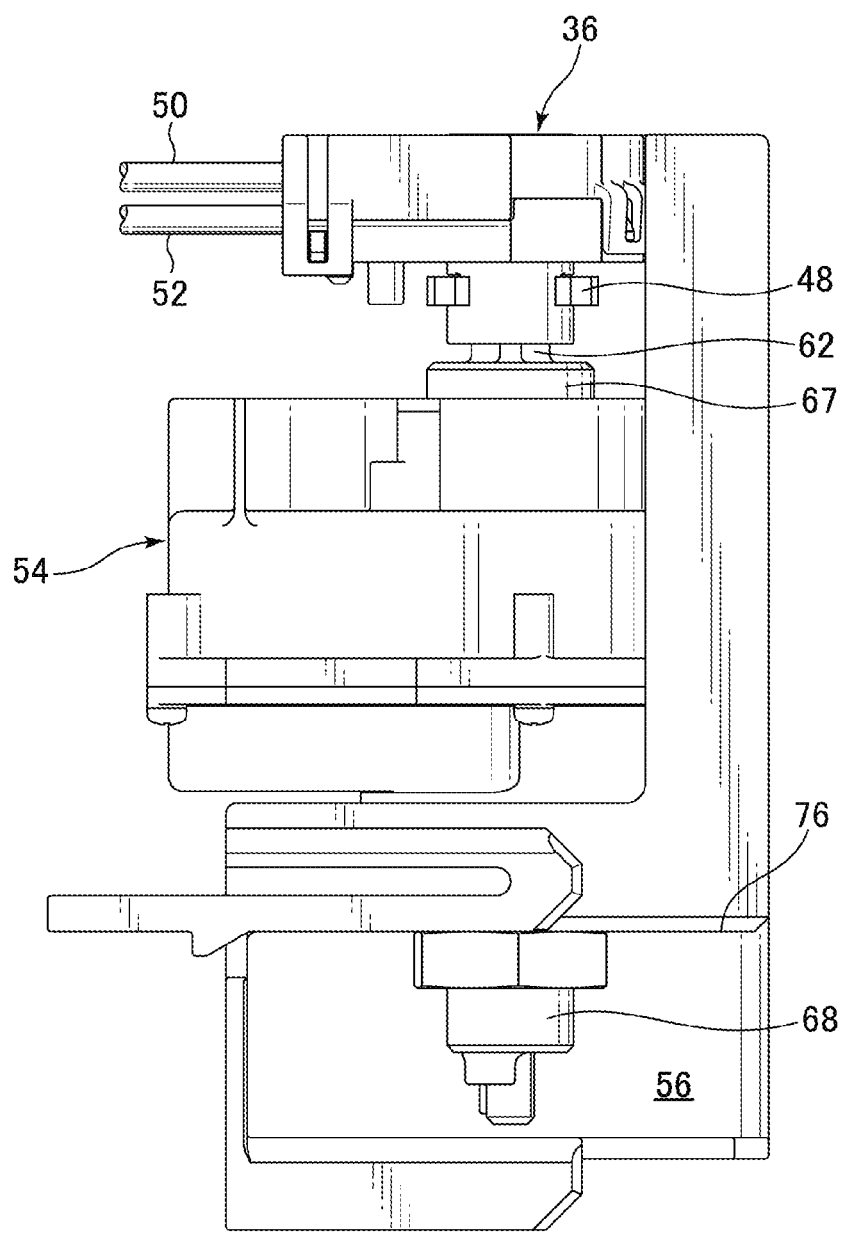
FIG. 6 is a back view seen from the back side, with the attaching members detached, of the discharge valve operating portion in a flush water tank apparatus discharge valve mechanism, a power drive unit, and a housing portion.

As shown in FIGS. 5 through 7, the housing portion 56 is formed by an attaching member 74 attached to the side wall of the flush water tank 8, and a housing member 76 constituting a cuboid interior space by attached to the attaching member 74.

The attaching member 74 is affixed to the side wall 8a of the flush water tank 8, and forms a vertical wall 74a along the side wall 8a. At a position adjacent to the communication hole 8c, an opening portion 74b larger than the communication hole 8c is formed on the vertical wall 74a of the attaching member 74.

The housing member 76 is formed in a box shape. One surface opens in the side of the side wall 8a in the box shape. Thus by disposing the opening side of the housing member 76 toward the vertical wall 74a of the attaching member 74, an internal space is formed within the housing portion 56, further partitioned from an internal space in the flush water tank 8. The housing portion 56 is thus opened through the opening portion 74b and communication hole 8c toward the outside of the flush water tank 8. I.e., the interior space of the housing portion 56 is opened toward the outside of the flush water tank 8.

The attaching member 74 may also be omitted from the housing portion 56, which may be formed by the housing member 76 and the side wall 8a.

As shown in FIG. 3, the housing portion 56 is affixed to the flush water tank 8 by attaching the housing member 76 to the attaching member 74. The housing member 76 of the housing portion 56 is formed to support the power drive unit 54 from lower portion through the casing 64.

The housing member 76 of the housing portion 56 further comprises an extending portion 76a extending to an upper portion on the side of the power drive unit 54; this extending portion 76a supports the casing 38 of the discharge valve operating portion 36 on the discharge valve mechanism 13 linked to the output shaft 62 of the power drive unit 54. The housing member 76 of the housing portion 56 supports the discharge valve mechanism 13, and also supports the power drive unit 54 from an upper portion of it.

The bottom end of the housing portion 56 is disposed above the top end 26b of the overflow pipe 26. The housing portion 56 forms a water drain gap 56a (drain portion) which communicates at the lower portion thereof from the interior of the housing portion 56 to the interior of the flush water tank 8. The water drain gap 56a (drain portion) may also be formed by a drain hole formed in the bottom surface of the housing portion 56.

Next, referring to FIGS. 7 and 8, we explain the air passage.

The communication hole 8c formed in the side wall 8b of the flush water tank 8 forms an outside air passage 72 which communicates between the interior of the housing portion 56 and exterior of the flush water tank 8. The outside air passage 72 is schematically shown by arrow 72 in FIG. 8.

In the flush toilet tank apparatus 1, an air passage is formed to communicate from motor 60 of the power drive unit 54, through the housing portion 56, to the exterior of the flush water tank 8. This air passage includes a drive unit internal air passage 70 (see FIG. 8), and a linearly extending outside air passage 72.

The flow path cross sectional area of the outside air passage 72 is arranged to be greater than the cross sectional area of the gap 56a communicating from the interior of the housing portion 56 to the interior of the flush water tank 8. Therefore the flow volume of air between the interior of the housing portion 56 to the exterior of the flush water tank 8 is made to be greater than the flow volume of air between the interior of the housing portion 56 and the interior of the flush water tank 8.

In the above-described flush toilet tank apparatus 1 according to an embodiment of the invention, the housing portion 56 is formed to surround the perimeter of the outlet 70a on the drive unit internal air passage 70 which extends from the motor 60 of the power drive unit 54, therefore penetration of moisture in the flush water tank 8 into the motor 60 of the power drive unit 54 can be constrained. In cases where moisture penetrates the housing portion 56, or temperature of the motor 60 is cooled after the motor 60 emits heat such that condensate occurs around the motor 60, an air passage which communicates from the motor 60 through the housing portion 56 to the exterior of the flush water tank 8 is formed, therefore moisture is released from the interior (inner portion) of the housing portion 56 to the atmosphere in the outside of the flush water tank 8. Thus moisture can be prevented from condensing at the interior of motor 60 in the power drive unit 54, and degradation or malfunction of the motor 60 can be constrained from occurring. Therefore the power drive unit 54, placed so as to be hidden inside the flush water tank 8, allows for long term, stable discharge valve mechanism 13 operational control, and for long term stable supply of flush water to the toilet body 10.

Also, according to a flush toilet tank apparatus 1 of the present embodiment, the air passage outlet portion 68 in which the outlet 70a is formed on the drive unit internal air passage 70 extending from the motor 60 is housed within the housing portion 56, therefore the housing portion 56 can be constituted at a minimum required size to surround the perimeter of the air passage outlet portion 68, and the housing portion 56 disposed within the flush water tank 8 can be compactly formed. Hence the degree of freedom to place the power drive unit 54 and the housing portion 56 can be increased. In addition, workability can be improved when installing the power drive unit 54 and housing portion 56 inside the flush water tank 8.

Furthermore, according to the flush toilet tank apparatus 1 of the present embodiment, the housing portion 56 is disposed above the top end 26b of the overflow pipe 26, therefore inflow of flush water to the power drive unit 54 inside the housing portion 56 can be prevented even when the flush water level inside the flush water tank 8 has risen over the full water level WL0. In addition, according to the present invention, leakage of flush water to the outside of the flush water tank 8 from the housing portion 56 can be prevented even when the flush water level inside the flush water tank 8 rises over the full water level WL0.

According to the flush toilet tank apparatus 1 of the present embodiment, the housing portion 56 is formed to surround the perimeter of the communication hole formed in the wall surface of the flush water tank 8. Therefore the need to add a separate member to form an air passage is eliminated, and communication between the interior of the housing portion 56 and the exterior of the flush water tank 8 can be effected by a communication hole formed in the wall of the flush water tank 8, so that the air passage can be compactly formed inside the flush water tank 8.

In the flush toilet tank apparatus 1 of the present embodiment, even in a flush water tank apparatus disposed in a position easily seen by toilet users, the communication hole is formed on the rear wall surface in rear side of the flush water tank 8, and therefore can be obscured from users so that design characteristics of the flush water tank apparatus 8 can be improved.

In a flush toilet tank apparatus 1 according to the present embodiment, a vertical disposition is adopted for the power drive unit 54 in which the output shaft of the power drive unit 54 extends in a vertical direction, so that space inside the flush water tank 8 can be effectively utilized. Thus the degree of freedom of design for devices installed inside the flush water tank 8 can be improved.

In addition, the housing portion 56 can also serve as a structure for supporting the power drive unit 54, so the need to add a separate member to support the power drive unit 54 can be eliminated. Therefore according to the present invention, the power drive unit 54 and housing portion 56 can be made comparatively compact.

Also, according to the flush toilet tank apparatus 1 of the present embodiment, the housing portion 56 can support the power drive unit 54 from lower portion, and support the discharge valve mechanism 13 linked to the output shaft of the power drive unit 54 at upper side portion. Therefore according to the present invention, deformation, breakage, and malfunctions of these members caused by the weight of the power drive unit 54 and the discharge valve mechanism 13 can be constrained.

Also, according to the flush toilet tank apparatus 1 of the present embodiment, penetration of moisture in the flush water tank 8 into the motor 60 of the power drive unit 54 can be constrained in the concealed-type flush water tank 8 concealed on the back side of the wall surface of the washroom. Also, moisture can be prevented from condensing at the interior of the motor 60 in the power drive unit 54, so that degradation or malfunction of the motor 60 can be constrained. Therefore the power drive unit 54, placed so as to be hidden inside the flush water tank 8, allows for long term, stable discharge valve mechanism 13 operational control, and long term stable supply of flush water to the toilet main unit 10.

Furthermore, according to the flush toilet tank apparatus 1 of the present embodiment, water can be discharged through the gap 56a for draining water from the interior of the housing portion 56 to the interior of the flush water tank 8, even if condense from the moisture in the housing portion 56 occurs. Thus occurring the condition that condensate water accumulates in the interior of the housing portion 56 and produces moisture in the interior of the housing portion 56, can be prevented.

What is claimed is:

1. A flush water tank apparatus storing flush water for flush a toilet, comprising:
   a flush water tank having a discharge opening;
   a discharge valve mechanism having a discharge valve configured to open and close the discharge opening by an operation of the discharge valve;
   a power drive unit mounted so as to be concealed in an interior of the flush water tank, and capable of electrically operating the discharge valve of the discharge valve mechanism, wherein the power drive unit comprises a motor rotationally driven by electricity and an output shaft for outputting rotation of the motor; and a housing portion formed so as to surround an outlet of a drive unit interior air passage extending from the motor of the power drive unit inside the flush water tank;
   wherein the housing portion is opened toward an outside of the flush water tank, and an air passage is formed to communicate from the motor of the power drive unit through the housing portion to the exterior of the flush water tank.

2. The flush water tank of claim 1, wherein the power drive unit further comprises a casing in which the motor and the output shaft are disposed;
   and wherein an output shaft-side end portion passing through the output shaft and forming an air-sealing structure and an air passage outlet portion in which the outlet of the air passage extending from the motor is formed, and the air passage outlet portion is housed inside the housing portion.

3. The flush water tank apparatus of claim 1, further comprising an overflow pipe for discharging flush water exceeding full water level in the flush water tank from the discharge opening, and the housing portion is disposed above the top end of the overflow pipe.

4. The flush water tank apparatus of claim 1, wherein the housing portion is formed to surround the perimeter of a communication hole formed in the wall surface of the flush water tank.

5. The flush water tank apparatus of claim 4, wherein the communication hole is formed in the wall surface at the rear side of the flush water tank.

6. The flush water tank apparatus of claim 1, wherein the output shaft of the power drive unit extends in the vertical direction of the power drive unit;
   and the housing portion is affixed to the flush water tank, and is formed to support the power drive unit.

7. The flush water tank apparatus of claim 6, wherein the housing portion comprises an extended portion extending through a lateral side of the power drive unit to upper portion, wherein the extended portion supports the discharge valve mechanism linked to the output shaft of the power drive unit.

8. The flush water tank apparatus of claim 1, wherein the flush water tank is a concealed-type flush water tank concealed in the reverse side of a wall in the washroom.

9. The flush water tank apparatus of claim 1, wherein the housing portion forms a water drain portion communicating from the interior of the housing portion to the interior of the flush water tank in the lower portion of the housing portion.

* * * * *